Patented Oct. 13, 1931

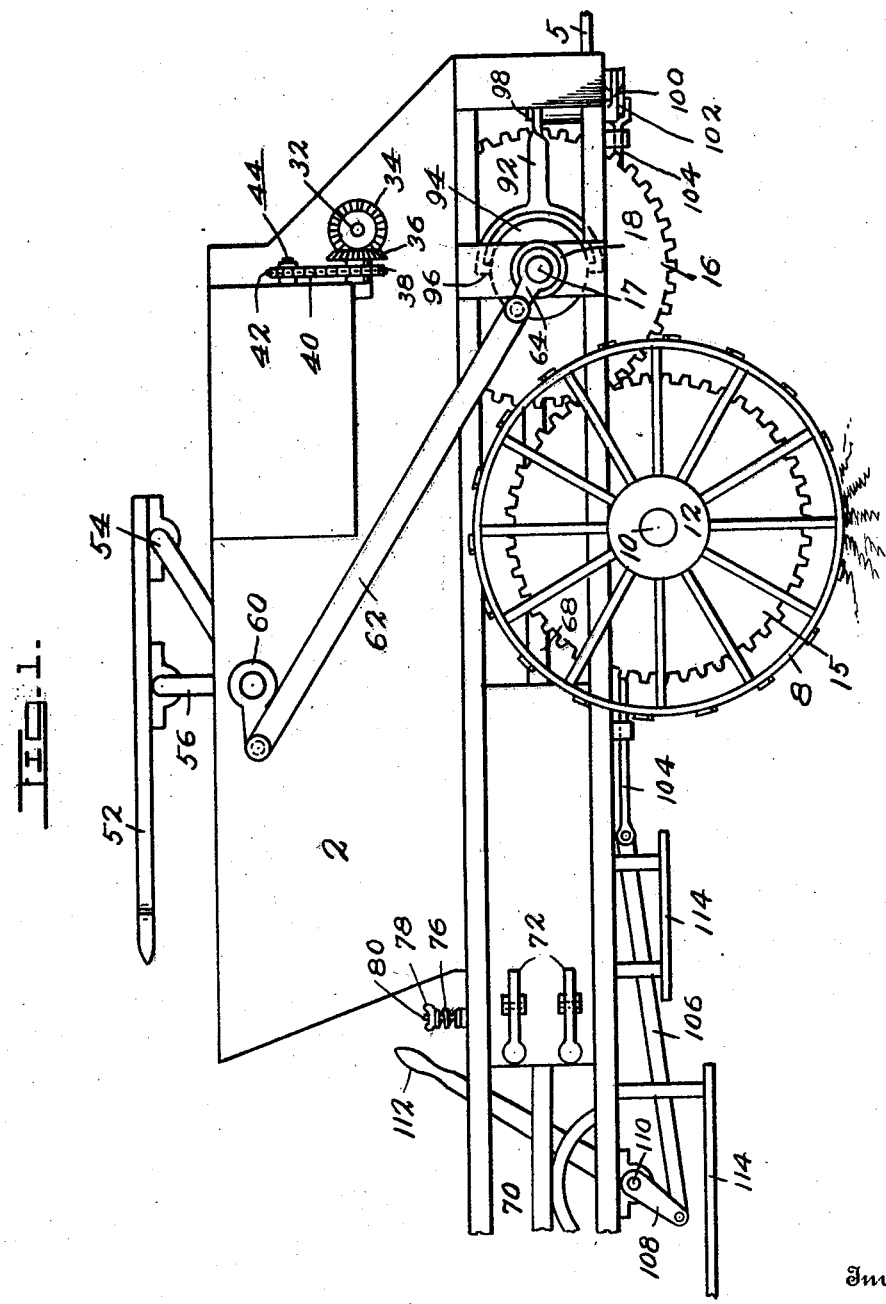

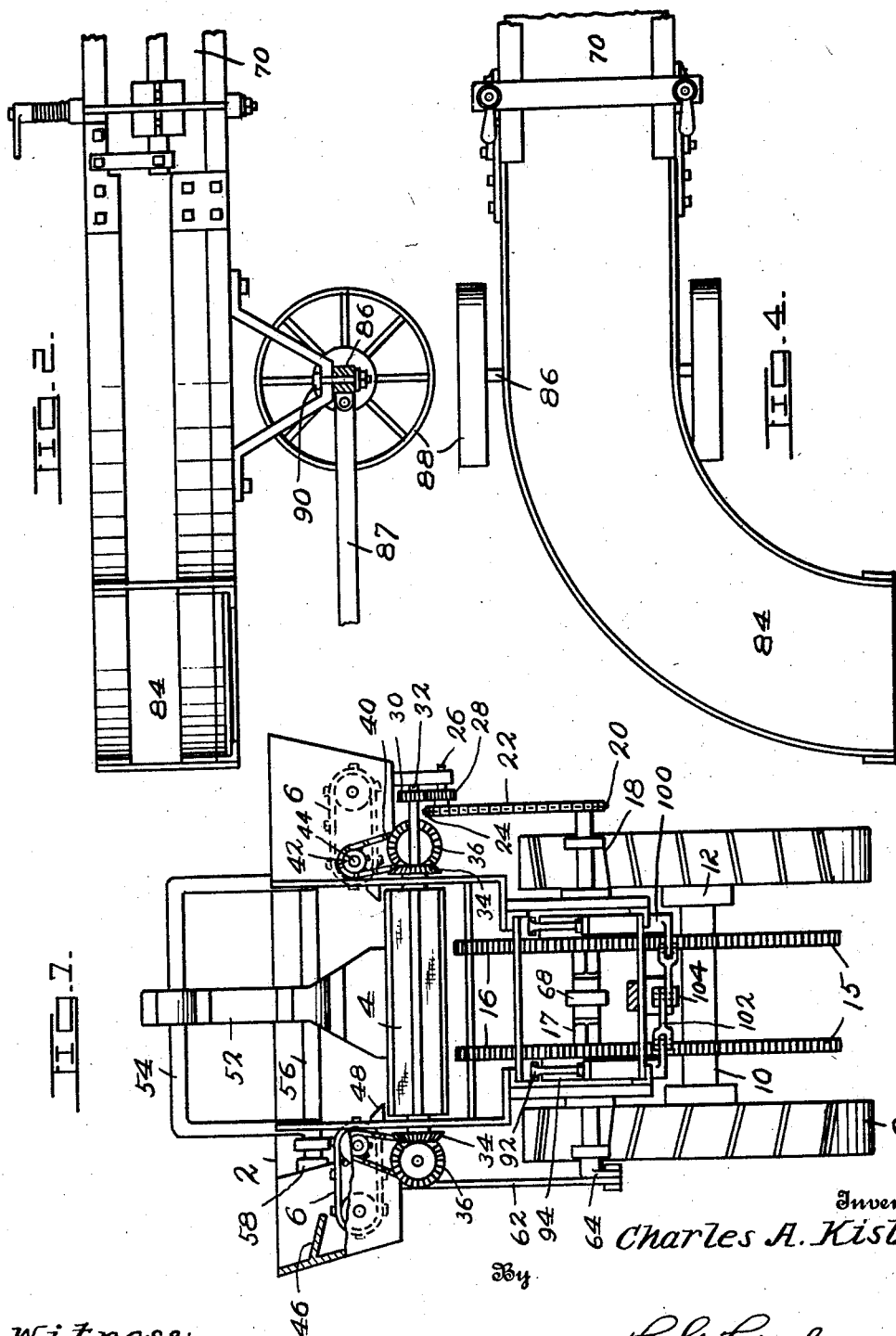

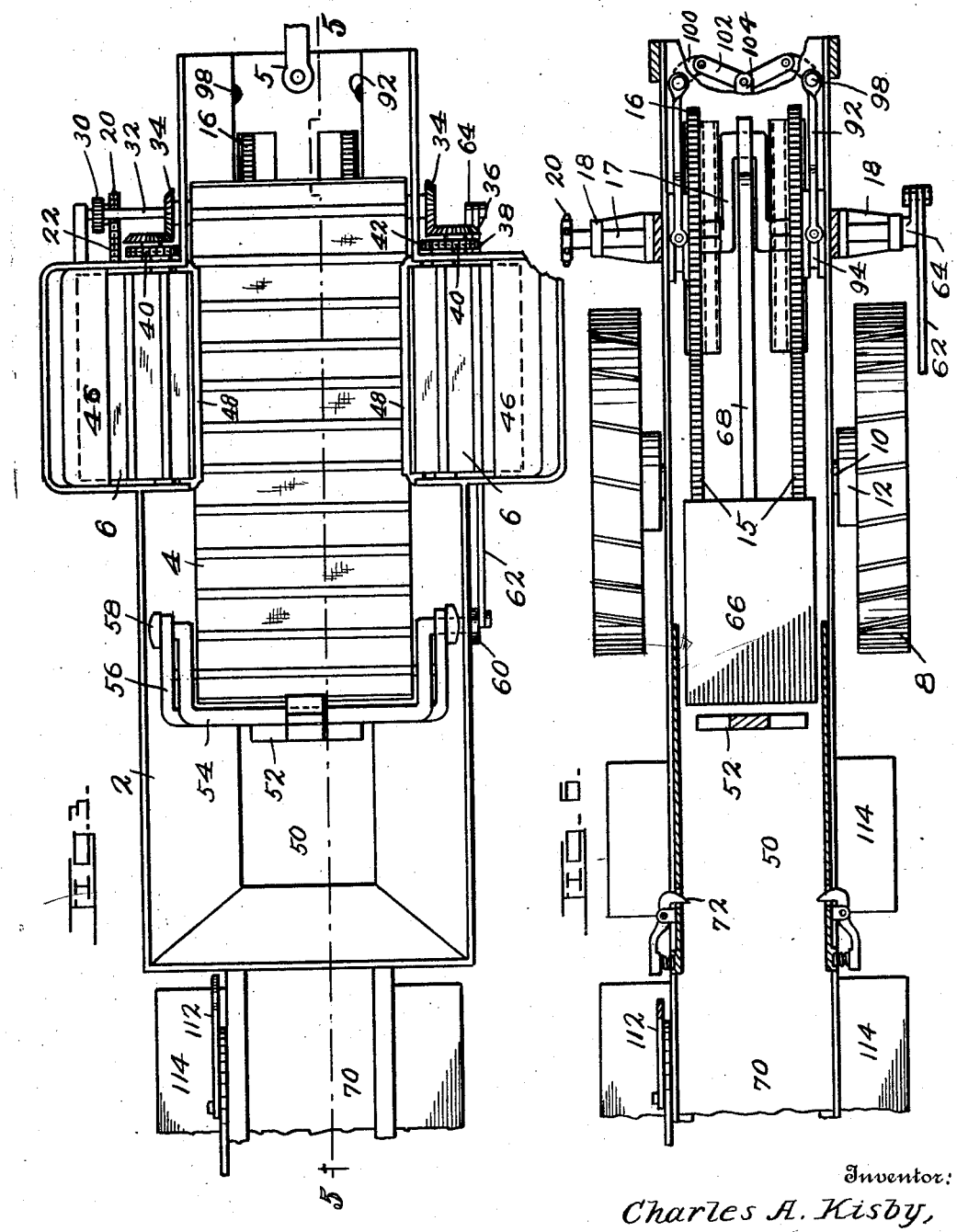

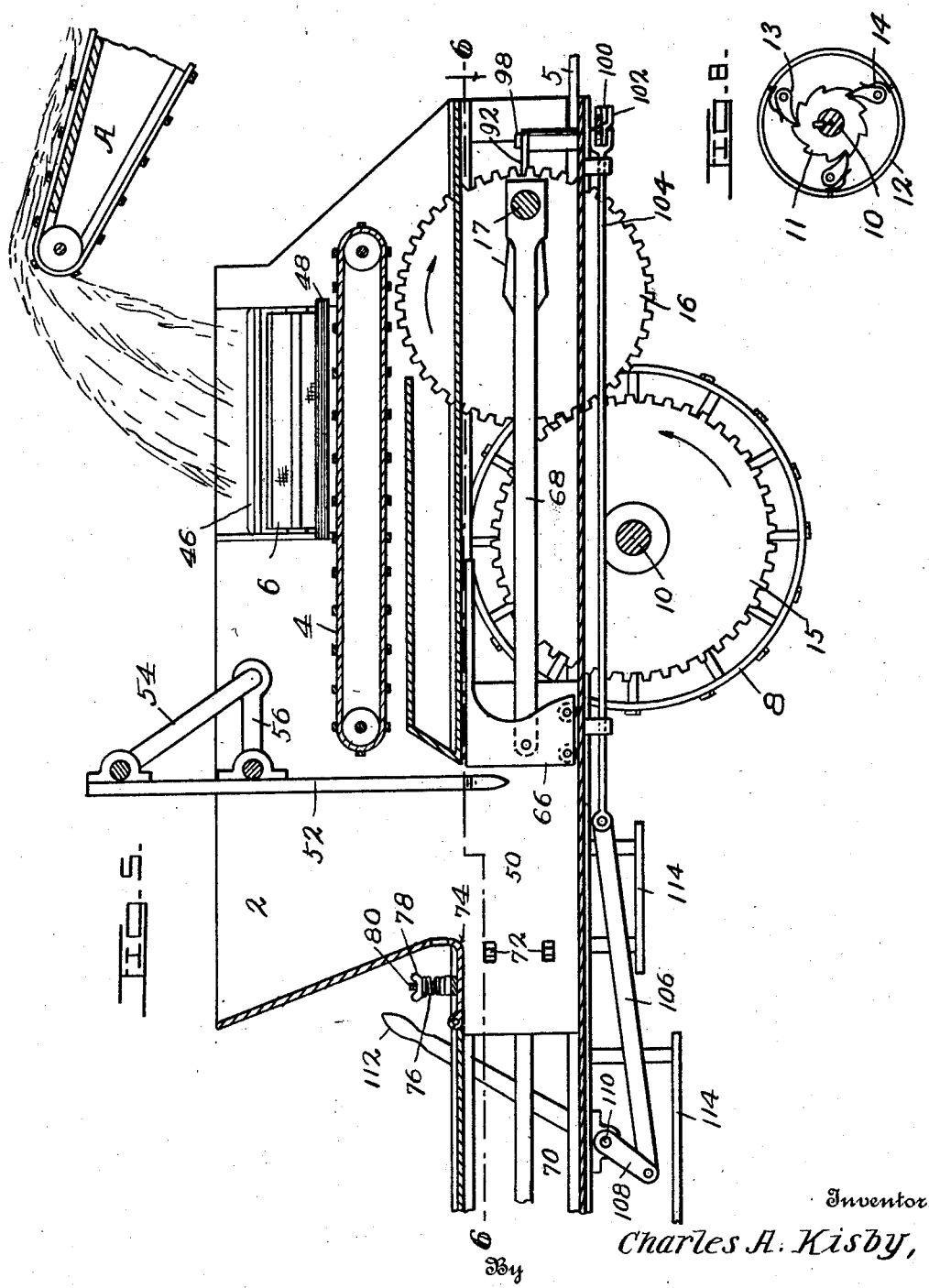

1,827,024

UNITED STATES PATENT OFFICE

CHARLES A. KISBY, OF MORGANVILLE, KANSAS, ASSIGNOR OF ONE-THIRD TO JAMES H. GRIFFIN, OF CLAY CENTER, KANSAS

BALING PRESS

Application filed April 28, 1928. Serial No. 273,578.

My invention relates to improvements in baling presses and my object is to provide a machine of this character which may be drawn back and forth through a field by means of a tractor or other motive power and receive hay from a loader coupled to the rear of the press, compress the hay into bales and deposit the latter either upon the ground at one side of the press or upon a rack carried by a farm wagon driven beside the delivery end of the baling press, thereby saving time and labor over the old method of gathering the hay from the field, stacking the hay, and then baling from the stack.

In order that the invention may be fully understood, reference will now be had to the accompanying drawings, in which:

Fig. 1 is a broken side elevation of a baling press made in accordance with the invention.

Fig. 2 is a broken continuation of Fig. 1.

Fig. 3 is a broken plan view of the baling press.

Fig. 4 is a broken continuation of Fig. 3.

Fig. 5 is a broken vertical longitudinal section of the press on line 5—5 of Fig. 3.

Fig. 6 is a broken horizontal longitudinal section of the press on line 6—6 of Fig. 5.

Fig. 7 is an end elevation of the press.

Fig. 8 is a detail of the ratchet mechanism through which the baling and other mechanisms of the press are driven from the two rear transport wheels of the latter.

Referring in detail to the different parts, 2 designates a hopper containing an endless main conveyer 4, which receives the material to be baled from a hay loader A detachably connected by a link 5 to the rear end of the baling press in order to be drawn through the field for the purpose of gathering the hay and discharging it onto the conveyer 4. The conveyer 4 extends longitudinally of the press and as it is desirable to have it of less width than the hay loader I have provided a pair of short auxiliary transverse conveyers 6 for receiving a portion of the material from said hay loader and conducting it to the main conveyer 4, at the opposite sides of which latter said auxiliary conveyers 6 are arranged as shown by Figs. 3 and 5.

The main conveyer 4 is driven from the two large rear drive wheels 8 of the baling press by the following mechanism. 10 designates the rear axle which is equipped with two fixedly mounted ratchet wheels 11 enclosed in casings 12 fixed to the wheels 8. The casings 12 are provided with pivotally mounted pawls 13 which are yieldably pressed by springs 14 into engagement with the ratchet wheels 11 to drive the latter forwardly and also to allow one of the drive wheels 8 to travel faster than the other when the press is turning around in the field. The axle 10 is equipped with a pair of fixedly mounted master cog wheels 15 for driving a pair of cog wheels 16 which are mounted upon and drive a main crank shaft 17 journaled in bearings 18 fixed to opposite sides of the rear portion of the baling press. The crank shaft 17 is provided at one end with a fixedly mounted sprocket wheel 20 which drives an endless sprocket chain 22 which in turn drives a sprocket wheel 24 fixedly mounted upon a countershaft 26 having a fixedly mounted cog wheel 28 which drives a cog wheel 30 fixedly mounted upon the drive shaft 32 of the main conveyer 4.

The auxiliary conveyers 6 are driven in reverse directions to deliver the material thereon to the main conveyer 4 through the intermediary of bevel gears 34 fixed upon the drive shaft 32, bevel gears 36, sprocket wheels 38 fixed to said bevel gears 36, sprocket chains 40, and sprocket wheels 42 mounted upon the drive shafts 44 of the conveyers 6. The material delivered from the loader A is prevented from falling between the ends of the hopper 2 and the adjacent ends of the auxiliary conveyers 6 by inclined boards or deflectors 46, and the material is prevented from being carried around under said conveyers 6 by strips or deflectors 48.

As the material is delivered by the main conveyer 4 to the front portion of the hopper 2, said material is forced downwardly into the feed chamber 50 of the baling press by means of a condenser 52 which is raised and lowered by crank shafts 54 and 56, the former of which is longer than the latter so that said condenser 52 will be carried down from the horizontal position disclosed by Fig. 1 to the vertical position shown by Fig. 5. The crank shaft 56 is mounted upon the crank shaft 54 which is rockably mounted in bearings 58 in opposite sides of the hopper 2. One end of the crank shaft 54 extends through the adjacent side of the hopper and is provided with a fixedly-mounted crank 60 which is rocked to and fro by a connecting bar 62 actuated by a crank 64 fixed to one end of the main crank shaft 17.

The condenser 52 consists of a bar with two lateral shoulders at its lower end and when making its upward stroke its lower end is swung forwardly and upwardly by the action of the crank shafts 54 and 56, so as not to impede delivery of the material from the conveyer 4 to the feed chamber 50.

On each downward movement of the condenser 52 a charge of the material is forced into the feed chamber 50 in advance of a reciprocatory plunger 66, which is actuated by a pitman 68 operably connected at its rear end to the main crank shaft 17. On each forward movement of the plunger 66 a charge of the material is forced into the baling case 70 and behind a pair of retainers 72, against which the usual division blocks, not shown, for dividing the bales from each other are placed one by one. Any material caught between the upper forward portion of the plunger 66 and the forward portion of the feed chamber 50 is forced downwardly in front of said plunger by a tucker 74, yieldably held in its lowermost position, Fig. 5, by coil springs 76 which are tensioned by thumb nuts 78 threaded upon rods 80 secured to the top of the baling case 70 and extending upwardly through the tucker 74 and the springs 76.

As the material is compressed into bales the latter are bound by wire in the usual way and forced outwardly through the forward end of the baling case 70 upon a chute 84. The chute 84 is a continuation of the baling case 70 and is curved laterally to discharge the bales either upon the ground, out of the path of the baling press and the loader, or onto a rack carried upon the running gear of a farm wagon which may be driven beside said baling press.

The forward portion of the baling case 70 is mounted upon a front axle 86 having a tongue 87 to which a tractor or other motive power, not shown, may be coupled. The front axle 86 is provided with a pair of transport wheels 88 and pivotally mounted upon a king-bolt 90 so that the baling press may be guided as it is drawn from place to place.

The gear wheels 16 are slidably mounted upon the main crank shaft 17 so that they may be thrown out of engagement with the master gears 15 when it is desired to stop the conveyers 4 and 6, the condenser 52 and the plunger 66. That portion of the crank shaft 17 upon which the gears 16 are mounted is rectangular in cross section in order to drive said gears 16 and permit them to be thrown in and out of engagement with the master gears 15 by suitable shifting mechanism. In the present instance said shifting mechanism consists of levers 92 which are forked at their forward ends to fit over the grooved hubs 94 of the gear wheels 16 and provided with studs or lugs 96 which project into the grooved portions of said hubs 94, pivots 98 upon which the levers 40 are fixed, arms 100 fixed to the lower ends of the pivots 96, a pair of links 102 pivotally connected to the arms 100, a rod 104 pivotally connected at its rear end to the overlapping ends of the links 102, a connecting rod 106 pivotally secured at its rear end to the forward end of the rod 104, a crank 108 pivotally connected to the forward end of the connecting rod 106 and fixedly mounted upon a shaft 110, and a hand lever 112 fixed to the shaft 110 and extending upwardly near one side of the baling press within convenient reach of a workman standing upon one of the running boards 114 suspended from the baling case 82.

From the foregoing description it is apparent that I have provided a baling press in which the endless conveyers 4 and 6, the condenser 52 and the plunger 66 are driven from the drive wheels 8 of said baling press. It is also apparent that the functions of gathering the hay or other material, compressing it into bales, and delivering the completed bales either upon the ground or upon a vehicle driven beside the press is automatically accomplished and consequently a maximum amount of work may be performed at a minimum expense of time and labor.

While I have shown a preferred arrangement of the baling press, I reserve all rights to such changes and modifications thereof as properly fall within the spirit and scope of the invention as claimed.

Having thus described my invention, what I claim and desire to secure by Letters Patent, is:

In a baling press a feed chamber, a plunger operably mounted in said feed chamber, a horizontally disposed conveyer located immediately over said plunger and arranged to discharge into the feed chamber, two short horizontally disposed conveyers located above and at opposite sides of the first-mentioned conveyer for discharging upon the latter, and a hopper extending above and around three sides of the first mentioned conveyer and having lateral extensions projecting above and extending around three sides of said short conveyers.

In testimony whereof I affix my signature.

CHARLES A. KISBY.